No. 625,078. Patented May 16, 1899.
W. S. WRIGHT.
WEEDER.
(Application filed Dec. 9, 1898.)
(No Model.)
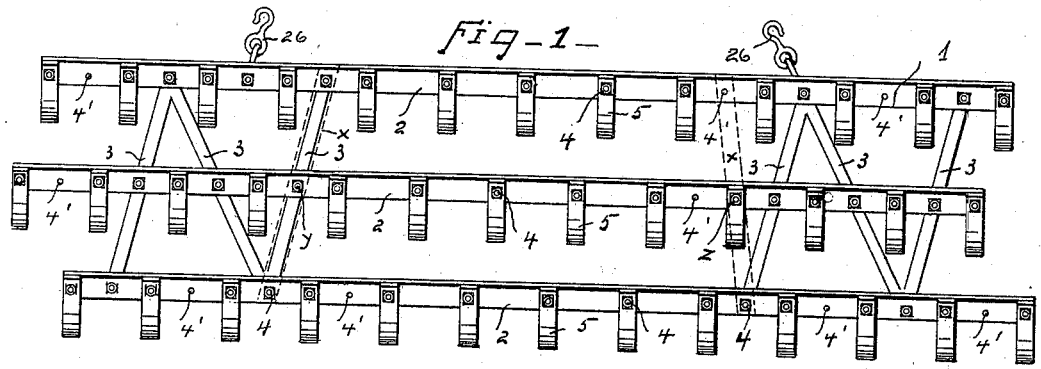
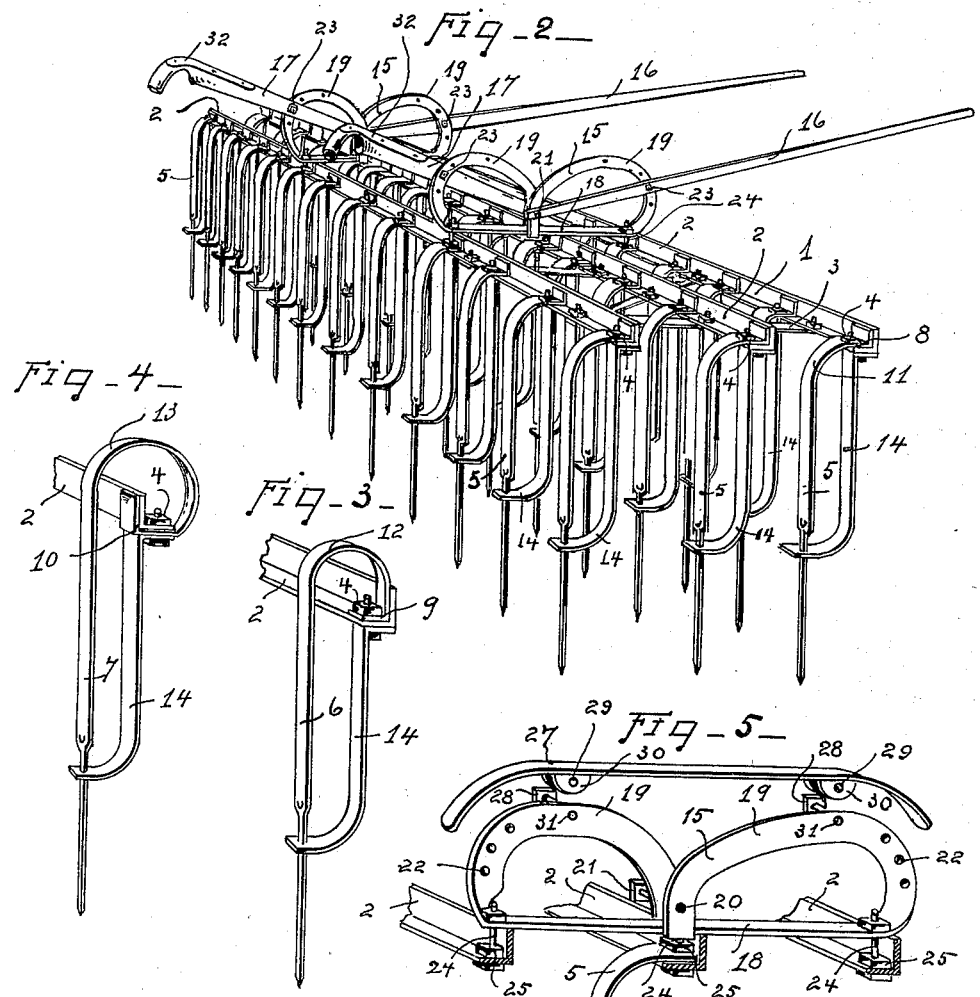
Witnesses
Herman H. Martin
Hattie Harris
Inventor
William S. Wright
By Robt. B. Wilson,
his Attorney.

UNITED STATES PATENT OFFICE.

WILLIAM S. WRIGHT, OF TOLEDO, OHIO.

WEEDER.

SPECIFICATION forming part of Letters Patent No. 625,078, dated May 16, 1899.

Application filed December 9, 1898. Serial No. 698,754. (No model.)

*To all whom it may concern:*

Be it known that I, WILLIAM S. WRIGHT, a citizen of the United States, residing at Toledo, in the county of Lucas and State of Ohio, have invented a new and useful Improvement in Weeders, of which the following is a specification.

The invention relates to that class of agricultural implements known as "weeders."

It is well known that the adaptation of the weeder to its special purpose is due to the flexibility and elasticity of its fingers. If their flexibility and elasticity are materially reduced, the weeder degenerates into a poor harrow. Different conditions of soil require different degrees of resistance in the fingers, but none the less elasticity. It is for this reason that a finger that is adapted to one condition of soil is not sufficient for another. To provide means to increase or decrease the resistance of the fingers without lessening their elasticity is therefore desirable to fit it for hard or soft conditions of soil.

Furthermore, a weeder outside of its special field of operation is an unwieldy implement, troublesome, and difficult to move about from barn to field or from field to field or along lanes and roads. For this reason it is desirable that it should be provided with means whereby it may be safely and easily moved about a farm and along roads.

Furthermore, by reason of its structure the weeder has to be shipped from the factory in pieces to the farmer, who has to put it together for use, and when he is done using it for the season it is desirable that it should be again taken to pieces for storage, as requiring less room and lessening the liability of receiving or inflicting injury. This makes it desirable also that a weeder should be constructed so that similar parts are interchangeable and upon a simple plan that is not puzzling to the farmer to put together. It is desirable also that it should be so constructed that the nuts which fasten the bolts that attach the fingers and hold the several parts together should be readily accessible without obliging the farmer to get into dangerous positions to tighten them while a horse is hitched to it.

The object of this invention is to supply each of these desiderata and produce a weeder that may be easily adapted to hard or mellow conditions of soil, that may be readily and safely moved about a farm, and that may be compactly packed for shipment by the manufacturer and put together without perplexity by the farmer. I attain these several objects in the manner and by the means hereinafter set forth and described, and illustrated in the drawings.

In the drawings, wherein like numerals of reference indicate similar parts, Figure 1 is a top view of the frame of the weeder with the handle-bars, thills, and their supporting attachments removed the more readily to illustrate the interchangeable character of the parts. Fig. 2 is a view in perspective of the weeder ready for use. Figs. 3 and 4 show modified forms of fingers from those shown in Figs. 1 and 2; and Fig. 5 shows a bracket for attaching the handle-bars and thills with a shoe attachment separated for moving the weeder about from field to field, &c.

In the drawings, 1 is the frame of the weeder, which is formed by a plurality of angle-bar sections 2, preferably three in number, connected together, with their inner angles uppermost, by N-shaped connecting-pieces 3, preferably constructed of a single flat bar formed into two equal angles having one side common to each and their independent sides of equal length, which when bolted to the horizontal webs of sections 2 by bolts 4 are adapted to hold the sections rigidly in parallel position and at equal intervals.

Sections 2, which are preferably in all respects exact counterparts in dimensions and construction, are provided with holes in their horizontal webs throughout their length at equal intervals for attaching the fingers. They are also each provided at each end with an equal number of holes 4', central between the fingers, for attaching the connecting-pieces 3, which are also provided with holes at each end at their angles and centrally through each side of their angles for that purpose at lateral intervals corresponding to an interval or intervals between holes 4' in the sections adapting them to such attachment. To secure accuracy of position and interchangeability of the sections 2 and of the connections 3, respectively, the holes in the sections 2, both for the fingers and for the connections 3, should be punched through the same templet and the holes in the connections 3 through a templet provided for them adapted to secure exact correspondence of their angles and sides and ends and of the holes therein respectively to each other and at lateral intervals corresponding with an interval or intervals between holes 4' in the sections. All holes in the sections, their fingers, and the connections 3 are preferably of the same size, for which bolts 4 are interchangeably adapted.

The parallel sides of the connections 3 being of the proper length and formed obliquely at the proper angle from a perpendicular, when the sections 2, properly adjusted with the fingers to the rear, are bolted to them in parallel position in such manner as that all the holes in the connections 3 are brought into coincidence with holes 4' in the sections the fingers of each section will be relatively in echelon with the fingers of the other sections, so as that each finger in the weeder will travel on a separate and distinct line when the weeder is drawn forward whatever may be the relative longitudinal positions of the sections 2, which it is manifest may be varied in several ways from that shown in Fig. 1. I am aware that it is not new for the fingers of a weeder and the teeth of other similar implements to travel on separate, distinct, and equidistant lines; but what is here presented as new is a frame of a weeder the form of which may be changed and the parts of which are interchangeable without disturbing the relations of the fingers in respect to their traveling on separate, distinct, and equidistant lines and that may be readily assembled.

Sections 2 are each provided with fingers, which may be of either one of the three forms shown, 5, 6, or 7, according to the degree of flexibility and elasticity required by the nature of the soil in which they are to be used. The fingers 5, 6, and 7 are each square or diamond shaped in cross-section in their lower portions, terminating in a point, and flat and spring-yielding as to their upper portions and are provided at their upper ends with angles 8, 9, and 10, adapting them each to its special engagement with the webs of the angle-bar sections 2, and with curves 11, 12, and 13, respectively, as shown in Figs. 2, 3, and 4, to give them different degrees of flexibility and elasticity. The fingers 5, 6, and 7 are each preferably made of flat spring-steel angled and curved at their upper ends, respectively, as aforesaid, and their lower portions forged square or diamond shape in cross-section, with two opposite angles central with the line of their movement and the other two at right angles thereto. I adopt the square or diamond shape for the lower portion of the fingers for two reasons, the first of which is that it makes them more effective in catching and pulling up the weeds, and, second, that it serves a useful purpose in the attachment of auxiliary springs 14, as hereinafter described. Fingers 5, 6, and 7 are each also provided with holes through their upper ends in positions adapting them, respectively, for the special attachment of each to the horizontal webs of sections 2, as shown in Figs. 2, 3, and 4, when the sections are in their proper positions in the frame 1, with their inner angles uppermost, so as that when they are so attached their respective curves 11, 12, and 13 will bring their straight body portions to assume a vertical position to the rear of and below the section to which they are attached, with their points downward, and the strain produced by the resistance of the fingers to a forward movement will be resistably received as a thrust by the vertical webs of the sections 2 simultaneous with its action on the horizontal webs, thus rendering available the strength of the entire section for its resistance. It will appear from an examination of the drawings that either of the different forms of fingers 5, 6, or 7 may be used without involving any change in the position of the sections 2 or of the holes therein for attaching the fingers and the connections 3, excepting that when the fingers 7 are used the sections 2 are reversed lengthwise, bringing the vertical webs of the sections to the rear of the horizontal webs, as shown in Fig. 4, instead of in front, as in Figs. 1, 2, and 3, where fingers 5 and 6 are shown. Whichever form of finger is used, the inner angle of sections 2 is uppermost, and the nuts of bolts 4, securing the fingers and the connections 3, being also placed uppermost, are in a position where they may be conveniently reached from above and behind the weeder, the advantage as well as the greater security of which is obvious.

When the soil is hard and the resistance of fingers 5, 6, or 7, whichever may be in use, is not sufficient to be effective, auxiliary springs 14 may be used with either of them for the purpose of increasing their resistance. These springs are also formed of flat spring-steel, and each have their upper ends right-angled and provided with a hole for attachment to the horizontal webs of sections 2 with the fingers by bolts 4, so as to bring the straight body portion of the spring below and perpendicular to the section and parallel with the straight body portion of the fingers, with a flat side of the spring opposed to a flat side of the finger, and the lower portions are curved and provided at the lower end with a square or diamond shaped hole adapted to receive the similar-shaped lower portions of the fingers. When in such position and bolted with the fingers to the sections 2 by bolts 4, it is apparent that the resistance of the fingers is thereby reinforced without in any way affecting their flexibility and elasticity. It will be seen that the square or diamond shaped portion of the finger fitting into a similar-shaped hole in auxiliary spring 14 operates to keep the flat side of the spring presented to the flat face of its finger even if it should become loosened and prevents it assuming any other position and causes it always to coöperate with its finger in the direction of its greatest elasticity and flexibility.

Frame 1 is provided with brackets 15, which are attached to it at points indicated by dotted lines X X in Fig. 1, and serve as supports and attachments for the thills 16 and the handle-bars 17. Brackets 15 are preferably ⌶-shaped and formed of a single flat bar of metal with a quarter-twist at each end of the base 18 and the end portions bent edgewise to form the loops 19 and terminating with the ends on opposite sides of the base 18, which is made of a length suited to the width of the frame 1. Through the middle connections of the loops 19 with the base 18 are holes 20, which are provided with bolts 21, by which one end of a thill and one end of a handle-bar are attached by the same bolt to opposite sides of the middle connections. By this arrangement the thills are angled toward the shoulders of the horse that draws the weeder and the handle ends of the handle-bars 17 set wider apart for the operator. The outer connections of the loops 19 with the base 18 are each provided with a series of holes 22 and bolts 23, by which the thills 16 and the handle-bars 17 may be adjusted and held at any angle adapting them, respectively, to the horse and the operator. Brackets 15 are also provided with holes at intervals in their bases adapted to coincide with holes in each section 2 in the lines of their attachment to frame 1 and with special bolts 24, having lock-nuts 25, which adapt them to be substituted for bolts 4 at points where the attachment of the brackets coincides with the attachment of a finger or of connections 3. When forms 6 and 7 of the fingers are used, brackets 15 are slightly modified in form and mode of attachment, base 18 being placed underneath the sections 2 and bolted to the under side of their horizontal webs, with their end portions twisted and bent edgewise to form loops 19 around and over the two outer sections 2 of frame 1, with their free ends resting on the upper side of the horizontal web of the middle section 2. In this position bolts 4 are used, and the free ends of the loops 19 are held separate and prevented from any lateral movement when bolt 21 is in position and tightened either by the nut of a bolt 4, as at position Y of Fig. 1, or by the top part of a finger, as at position Z of the same figure, instead of by the base 18, as shown in Fig. 5. It will thus be seen that all parts are adapted to go together and are fully accommodated with ready means of attachment without adding to those provided for the frame and its fingers. Frame 1 is also provided with any suitable draft devices 26, adapted to be attached to it, either together with or separately from other attachments, as will most nearly centralize the draft.

To provide a ready means of moving the weeder about from place to place, shoes 27 are provided for each bracket 15, and when needed for use may be attached thereto by bolts 28 through holes 29 in lugs 30 and holes 31 in brackets 15. When so attached, by lowering thills 16 and handle-bars 17 and turning the weeder top side down it will rest on shoes 27 of brackets 15, as on the runners of a sled, and may then be drawn about by the horse safely and easily. As a substitute for shoes 31 plates 32, attached to handle-bar 17, may be used to serve a like purpose.

Having thus fully described my invention, what I claim to be new, and desire to secure by Letters Patent, is—

1. In a weeder, the combination of fingers having trailing rigid lower ends terminating in a point, for engaging the soil, and spring-yielding upper portions adapted to be secured to the frame of the weeder, and auxiliary springs, each adapted to be attached to the frame in parallel relation to the main body portion of a finger, and in coacting relation to its spring-yielding portion, and to resistably engage the trailing lower end portion thereof, substantially as and for the purpose hereinbefore set forth.

2. In a weeder, the combination, with a horizontal frame having angle-bar finger-supporting sections with the inner faces of the angle-bar supports placed uppermost, of flexible elastic fingers supporting the frame, secured in a vertical trailing position, to the horizontal webs of the sections with the nuts of the attaching-bolts uppermost, each finger having a straight rigid lower portion, square or diamond shaped in cross-section, and terminating in a point, and a flat spring upper portion curved and angled and adapted to the attachment aforesaid, and each provided with an auxiliary spring, 14, engaging the lower rigid portions of the fingers, and secured with the fingers to their supports by the same bolts, substantially as shown and for the purpose described.

3. In a weeder, the combination of a frame having fingers secured thereto, with thills for attaching a horse to the frame, and brackets adapted to be secured to the frame and to serve as supports and attachments for the thills, provided with shoes, or bearing-surfaces, upon which the weeder may be moved about as upon runners, when turned top side down.

4. In a weeder, the combination, with a horizontal frame having angle-bar finger-bearing sections with the inner face of the angle-bar placed uppermost, of flexible, elastic fingers supporting the frame, secured in a vertical trailing position, to the horizontal webs of the sections with the nuts of the attaching-bolts uppermost, each finger having a straight rigid lower portion, square or diamond shaped in cross-section, and terminating in a point, and a flat spring upper portion, curved and angled and adapted to the attachment aforesaid and to bear against the vertical web of its section, substantially as shown and for the purpose described.

5. In a weeder, the combination of a horizontal frame, comprising interchangeable angle-bar finger-bearing sections 2, having their inner faces uppermost, and transverse connecting-pieces, adapted to be secured to the sections, and to hold them in parallel and variable echelon relations, with flexible elastic fingers supporting the frame and secured in a vertical trailing position to the horizontal webs of the sections with the nuts of the attaching-bolts uppermost, each finger having a straight rigid lower portion, square or diamond shaped in cross-section, terminating in a point, and a flat spring upper portion, curved and angled and adapted to the attachment aforesaid and to bear against the vertical web of its section, substantially as and for the purpose set forth and described.

6. In a weeder, a horizontal frame comprising interchangeable angle-bar finger-bearing sections 2, with their inner faces uppermost and N-shaped interchangeable connecting-pieces 3, adapted to be bolted to the sections however the sections are interchanged, and hold them in different echelon relations to each other, in each of which relations each finger will travel in its own separate line when the frame is moved forward, in combination with flexible elastic fingers supporting the frame and secured in a vertical trailing position to the horizontal webs of the sections with the nuts of the attaching-bolts uppermost, each finger having a straight rigid lower portion, square or diamond shaped in cross-section terminating in a point, and a flat spring upper portion, curved and angled and adapted to the attachment aforesaid, and to bear against the vertical web of its section, substantially as and for the purpose set forth and described.

7. The combination of the frame, the handle-bars, the thills, the ⊐-shaped brackets 15, adapted to connect the thills and the handle-bars to the frame, having upwardly-extending loops 19, having a common attachment 21, for the thills and the handle-bars, and separate adjustable connections between the loops and the thills and the handle-bars respectively, whereby the inclination of the thills and handle-bars to the frame may be varied, substantially as set forth.

8. In a weeder, the combination of the supporting angle-bars 2, secured to and held in parallel echelon relations by N-shaped transverse connecting-pieces 3, and forming the frame of the weeder, with flexible elastic fingers supporting the frame horizontally with the inner faces of the angle-bar supports uppermost and secured in a vertical trailing position to the horizontal webs of the bars with the nuts of the attaching-bolts uppermost, each finger having a straight rigid lower portion, square or diamond shaped in cross-section terminating in a point, and a flat spring upper portion, curved and angled, and attached as aforesaid, and ⊐-shaped brackets 15, secured to the frame and provided with thills, handle-bars, and shoes, substantially as shown and for the purpose described.

WILLIAM S. WRIGHT.

Witnesses:
WALLACE E. COLLER,
JOSEPH N. RICARD.